Figure 1:
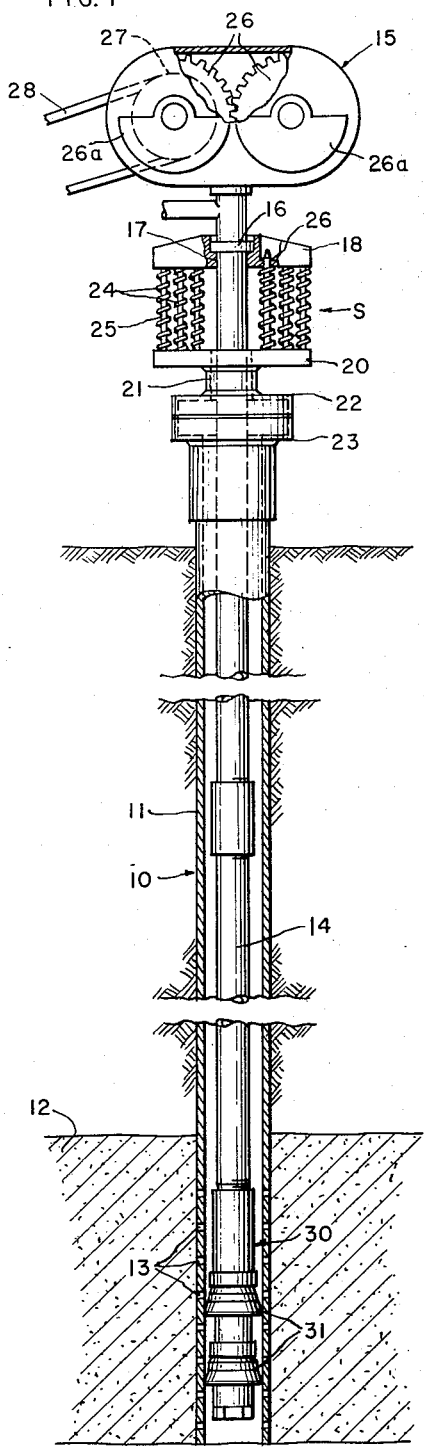

Jan. 9, 1962 A. G. BODINE 3,016,093
METHOD OF AND APPARATUS FOR CLEANING OUT OIL WELL CASING
PERFORATIONS AND SURROUNDING FORMATION BY
APPLICATION OF ASYMMETRIC ACOUSTIC WAVES
WITH PEAKED COMPRESSION PHASE
Filed July 12, 1957

INVENTOR.
ALBERT G. BODINE
BY
ATTORNEY

United States Patent Office 3,016,093
Patented Jan. 9, 1962

1

3,016,093
METHOD OF AND APPARATUS FOR CLEANING OUT OIL WELL CASING PERFORATIONS AND SURROUNDING FORMATION BY APPLICATION OF ASYMMETRIC ACOUSTIC WAVES WITH PEAKED COMPRESSION PHASE
Albert G. Bodine, Van Nuys, Calif.
(13120 Moorpark St., Sherman Oaks, Calif.)
Filed July 12, 1957, Ser. No. 671,463
11 Claims. (Cl. 166—43)

This invention relates generally to cleaning of oil wells, and more particularly to cleaning of wax from casing and liner perforations, screens, gravel packs, and the immediately surrounding productive formation.

The clogging of casing and liner perforations and screens with wax and particles of sand and gravel is a serious problem in many wells, particularly as the wells age. Not only are the slots, perforations, or screen mesh openings subject to clogging accumulations of wax and other materials, but gravel packs, and regions of the productive formation itself are also subject to such clogging, with consequent loss of production. In my Patent Re. 23,381, I disclosed a method and apparatus for cleaning out such clogging material by application of sonic waves. The method and apparatus there disclosed involved the generation and transmission of primarily sinusoidal sound waves.

The general object of the present invention is to increase very materially the effectiveness of the sonic wave process for cleaning out wax and other materials from casing and lining perforations, screens, gravel packs, and the surrounding formation.

The basic concept of the present invention is the use, in place of sinusoidal waves, of continuous waves of asymmetric wave form, characterized by peaked positive pressure half cycles, alternating with negative pressure half cycles of lower amplitude. Such waves are of increased effectiveness in cleaning out the material clogging the casing perforations, etc.

The invention is particularly beneficial in treating old wells, where the problems encountered in the sonic process are especially difficult. The fluid level in old wells, particularly those whose flow has materially diminished owing to clogging, as mentioned above, is generally very low. With a low fluid level, the mean hydrostatic pressure in the fluid column at the producing zone is correspondingly low.

Low mean hydrostatic fluid pressure lowers the amount of energy that can be carried by a sinusoidal wave transmitted through the well fluids, it being a familiar principle in the art of acoustics that the higher the mean pressure in the fluid transmitting medium, the higher the energy density of the wave. I have found that an asymmetric wave, with peaked positive pressure half cycles, alternating with negative pressure half-cycles of lower amplitude, will transmit materially higher energy for a given mean hydrostatic pressure than will a sinusoidal wave. Accordingly, for conditions of depleted mean hydrostatic pressure, the use of a continuous alternating asymmetric wave, with peaked positive pressure half cycles, enables the transmission of increased energy through the fluid medium present, enabling effective sonic wave cleanout of the clogged perforations, even under many conditions of greatly reduced hydrostatic pressure.

2

The invention accordingly provides a means for generating, in the well fluids adjacent the perforated casing, screen, etc. a continuous, asymmetric wave of peaked positive pressure half cycles.

Figure 2:
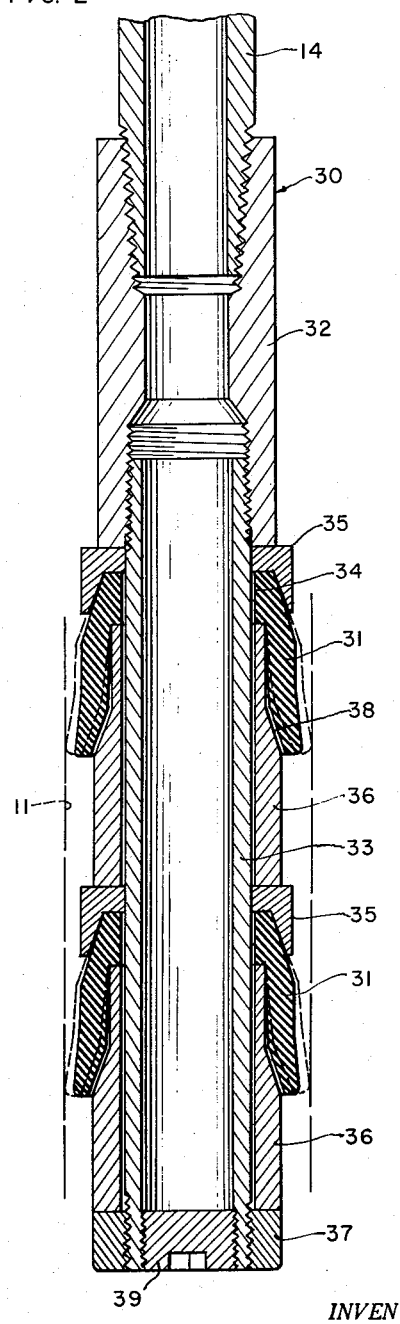

Present preferred illustrative apparatus for practicing the invention is described in the following detailed description and is illustrated in the accompanying drawing, wherein FIG. 1 shows the apparatus of the invention installed in a well, and FIG. 2 is a longitudinal sectional view of the sonic wave transducer of FIG. 1.

In the drawing, which shows one typical form and application of the invention, numeral 10 designates a well casing sunk in well bore 11 to the region of oil productive stratum 12, the lower end portion of the casing being perforated, as indicated at 13, within stratum 12.

A stiff elastic wave transmitting column, which may be a string of pump tubing composed of a good grade of elastic steel, is suspended within casing 10, and has mounted on its upper end a sonic wave generator 15, one preferred embodiment of which will be described presently. The elastic column 14 is of sufficient cross sectional area to be capable of transmitting elastic waves of compression as well as tension, and this "stiffness" characteristic distinguishes the column from flexible cables such as shown in my aforementioned Reissue Patent No. 23,-381, and such as are capable of transmitting only tension waves. The column stiffness characteristic here spoken of is of first importance, in that the wave transmission path becomes a high impedance line.

Column 14 has near its upper end a collar 16. The column 14 fits in an aperture 17 formed in a horizontal top plate 18 of a spring support device S, the collar 16 overhanging and bearing downwardly on said plate for the support of the column. Vertically spaced below top plate 18 is a horizontal bottom or base plate 20 carried by tubular member 21 and flange 22 bolted to casing head flange 23. Between base plate 20 and top plate 18 are a plurality of coil springs 24, positioned on vertical pins 25 set tightly into base plate 20 and projecting with working clearance through apertures 26 in top plate 18. The weight of the column 14 is thus transferred to springs 24 and thence through the casing head to the casing supported by the earth.

Sound wave generator 15 comprises a housing containing a means for setting up vertically directed vibrations and thereby exerting a vertical oscillating force upon the upper end of the column 14. The means for generating these vibrations may be mechanical, electrical, hydraulic or any other type capable of delivering sufficient power. A type of generator well adapted for the purpose has meshing oppositely rotating gears 26 carrying eccentric weights 26a which balance out horizontal vibrations but cause vertical vibrations to be additive to produce a substantial resultant oscillatory force in a vertical direction. The driving pulley 27 of the sound wave generator, mounted on the shaft for one of the spur gears, is driven by an electric motor or any other suitable prime mover (not shown) through belt 28.

Mounted on the lowermost end of the compression column or pipe string 14 is a sonic wave transducer generally designated by the numeral 30. In the operation of the equipment, elastic waves of compression and tension are transmitted from the wave generator 15 down the compression column 14, in a manner to be more fully explained hereinafter, with the result that the lower end portion of the pipe string 14 is set into low amplitude but powerful vertically oriented vibration. The transducer 30, which is in turn set into vertical vibration, is designed to radiate into the surrounding well fluids a continuous asymmetric sonic wave, having peaked positive pressure half cycles and lower negative pressure half-cycles. While a number of forms of transducer are capable of accomplishing this function, I have here shown a preferred form involving the use of one or more downwardly turned flexible rubber swab cups 31, which are normally contracted to a diameter less than that of the inside of the casing (FIG. 2, full line position), but which expand into engagement with the casing on each downstroke to generate therebelow a positive pressure half cycle, contracting again to separate from the casing on each upstroke to generate therebelow a negative pressure half cycle of substantially lesser amplitude. The detailed mechanism by which this effect takes place, and the consequence thereof, will be more fully set forth hereinafter.

Transducer 30 comprises a coupling member 32 screwed onto the lower end of pipe string 14, and into the lower end of which is screw coupled a hollow mandrel 33. The swab cups 31, which will be recognized to be of a well-known commercial type, have hub portions 34 fitted onto mandrel 33, and as shown in the illustrative embodiment, are downwardly oriented. However, as will appear hereinafter, the cups may be upwardly oriented, and such reversal is to be understood as coming within the scope of the invention. As here shown, the hub portions of the cups are fitted into thimbles 35, the uppermost of which engages against the lower end of coupling 32, and the lowermost of which, as here shown, engages against a sleeve 36 positioned on mandrel 33 between the hub of the upper cup and the lowermost thimble 35. A similar sleeve 36 is placed on mandrel 33 below lower cup 31, engaging the hub of the latter, as shown, and at its lower end, engaging a nut 37 screwed onto the lower end portion of mandrel 33. The sleeves 36 are conventionally shaped, as indicated at 38, to accommodate the usual inside contour of the swab cups. Optionally, the lower end portion of mandrel 33 may be closed by a screw threaded plug insert 39.

Generator 15 applies an oscillating force in a vertical direction to the upper end of elastic column 14, thereby launching alternating elastic deformation waves of tension and compression in a longitudinal direction down the column, said waves traveling in the elastic column with the speed of sound. The transmission of elastic waves along the length of an elastic column is a well understood phenomenon usually treated of in works on acoustics under the heading of "longitudinal vibrations of rods" and need not be explained in great detail herein. It should, however, be understood that longitudinal elastic waves in an elastic column cause sections of the rod to oscillate longitudinally of the column, with a displacement amplitude depending upon the energy of the wave and the longitudinal stiffness of the column.

For efficient transmission of the wave energy from the generator down the elastic column, the generator should preferably be adjusted to a resonant frequency of the column, so as to establish a standing wave along the column, this being accomplished in the case of a column with "free" ends, as here, by adjusting the speed of the generator to produce such a wavelength along the column that the column length is equal to an even number of quarter wavelengths. The standing wave results from interference of waves reflected by the ends of the column with the generated wave, as is well understood in the art of acoustics.

The standing wave pattern involved has velocity antinodes (regions of high vibration amplitude) at the upper end of the column or pipe string 14, and at the transducer 30, as well as at half-wave spaced regions therebetween. Intervening between these velocity antinodes are velocity nodes, i.e., regions of minimized vibration amplitude.

Thus the transducer 30 is vertically vibrated at the frequency of operation of the wave generator 15. Frequencies used may illustratively be in the range of 10 to 100 c.p.s., and the corresponding respective vibration amplitudes of the transducer may then be of the order of ¾" to ⅛".

The single frequency wave generator 15 is made very powerful, e.g., by use of large unbalanced masses, so that the transducer 30 undergoes a relatively long stroke, with very high accelerations. On each upstroke, by reason of the high acceleration owing to acoustic frequencies, and the inertia of the cups and the liquid thereabove, the cups contract and separate somewhat from the casing walls, thus opening a bypass wave path around the cups. The contracting upwardly travelling cups generate therebelow negative pressure pulses. These pulses are somewhat weakened by the inward bending of the cups. Also, by reason of the bypass openings around the contracting cups, these negative pressure pulses tend to run upwardly around the cups and be dissipated, and negative wave radiation is thus further weakened. In addition, the upwardly accelerating cups, when powerfully driven, as above stated, physically separate from the liquid on the upstroke, creating cavitation, with consequences on the ensuing downstroke to be described presently. This occurs because the well fluid, particularly in a well with low fluid level, and low hydrostatic pressure, is not under elastic compression conditions and, therefore, is incapable of following the cups on the upstroke. Negative waves are somewhat similarly generated by the closed lower end of the mandrel and the nut 37, acting like a piston. While this piston does not expand and contract, it generates a negative wave pulse on the upstroke, and may physically separate from the well fluids on the upstroke. The negative pressure pulse generated by the piston is also dissipated to a material extent through the bypass openings around the contracted cups. In a simpler form of the apparatus, the transducer may, in fact, comprise merely a fairly long piston closed at the bottom, in slidable contact with, or including sealing means in slidable contact with, the walls of the casing. Such a piston, when powerfully driven, will cause cavitation, and produce an asymmetric wave with peaked, steep fronted positive half cycles.

On the ensuing downstroke, the cups, trapping well fluid therebelow, and because of the inertia of such fluid, are expanded into substantially pressure sealing contact with the casing. The total system then becomes a relatively stiff positive wave generating system, the cups have an output impedance comparable to the impedance of the well fluids, and strong positive pressure acoustic wave pulses are radiated into the well fluids below the cups. In addition, assuming cavitation, described above as a separation of the cups and piston on the lower end of the mandrel from the well fluids therebelow on the upstroke, the low pressure voids so created are collapsed on the downstroke, causing a nonlinear wave form characterized by high, steep-fronted positive pressure half cycles. The positive pressure pulses on the downstroke are thus much higher and steeper than the negative pressure waves on the upstroke, and under conditions of cavitation, are very steep and highly peaked. The asymmetry of the wave is particularly marked or enhanced in wells with low fluid level and low hydrostatic pressure. These asymmetric waves, thus characterized by high amplitude positive pressure half cycles, alternating with low pressure half cycles, are radiated through the well fluids to the locations of the casing perforations, screen, gravel pack, surrounding formation, etc., and are highly effective in cleaning out clogging material therefrom. The peaked positive pressure waves are especially effective in forcing out the plugs of clogging material. The process permits the clean-out of perforations, etc., under condition of depleted hydrostatic well pressure, where sinusoidal acoustic waves, such as taught in my aforesaid patent, may be of relatively low effect.

It has been mentioned above that the cups may be used in inverted positions. In such case, the wave action is merely reversed, positive peaked half cycles being radiated on the upstroke, and lower amplitude negative half cycles being radiated on the downstroke. In such use, it may be desirable to remove the plug 39 from the mandrel, so as to avoid a wave cancelling effect.

It will of course be understood that the drawings and descriptions are to be taken merely as illustrative of and not restrictive on the invention, and that various changes in design, structure and arrangement may be made without departing from the spirit and scope of the invention as defined in the broader of the appended claims.

I claim:

1. An apparatus of the character described comprising: a nonlinear continuous acoustic wave transducer positionable in contact with the open well fluids inside the casing in a well, a stiff elastic column supporting said transducer in the well casing and extending to the ground surface, an acoustic wave generator at the ground surface acoustically coupled to the upper end position of said column, said transducer receiving and being vertically vibrated by acoustic wave energy transmitted thereto via said elastic column from said wave generator, and said transducer including acoustic wave radiation means having an output impedance of the order of the impedance of said well fluids, whereby an effective and continuous acoustic coupling is made thereto, and said wave radiating means having greater output impedance in one direction of said vibration than in the other direction such as to generate a continuous output wave form characterized by high positive pressure half cycles alternating with low negative pressure half cycles.

2. The subject matter of claim 1, wherein said wave radiating means of said transducer includes downwardly facing surface area adapted to radiate a positive pressure pulse on the downstroke and a negative pressure pulse on the upstroke.

3. The subject matter of claim 1, wherein said wave radiating means of said transducer includes downwardly facing surface area adapted to radiate a positive pressure pulse on the downstroke and a negative pressure pulse on the upstroke, and wherein said acoustic wave generator vibrates said transducer through a stroke amplitude and with an acceleration to cause cavitation on the upstroke and resulting steep-fronted positive pressure half cycles on the downstroke.

4. The subject matter of claim 1, wherein said wave radiating means includes a surface area adapted to radiate alternating positive and negative pressure pulses as said transducer is vibrated, and wherein said wave generator vibrates said transducer through a stroke amplitude and with an acceleration to cause cavitation during the negative pulse stroke and resulting steep-fronted positive pressure half cycles on the positive pulse stroke.

5. The subject matter of claim 2, wherein said wave radiation means comprises a piston and said facing area is on said piston.

6. An apparatus of the character described comprising: a nonlinear continuous acoustic wave transducer positionable in contact with the open well fluids inside the casing in a well, a stiff elastic column supporting said transducer in the well casing and extending to the ground surface, an acoustic wave generator at the ground surface acoustically coupled to the upper end position of said column, said transducer receiving and being vertically vibrated by acoustic wave energy transmitted thereto via said elastic column from said wave generator, and said transducer including acoustic wave radiation means having an output impedance of the order of the impedance of said well fluids, whereby an effective and continuous acoustic coupling is made thereto, and said wave radiating means having greater output impedance in one direction of said vibration than in the other direction such as to generate a continuous output wave form characterized by high positive pressure half cycles alternating with low negative pressure half cycles, said wave radiating means embodying a piston having a downwardly facing surface area adapted to radiate a positive pressure pulse on the downstroke and a negative pressure pulse on the upstroke, and said transducer including means effecting a substantial seal to the surrounding well casing during at least the upstroke of the transducer.

7. An apparatus of the character described comprising: a nonlinear continuous acoustic wave transducer positionable in contact with the open well fluids inside the casing in a well, a stiff elastic column supporting said transducer in the well casing and extending to the ground surface, an acoustic wave generator at the ground surface acoustically coupled to the upper end position of said column, said transducer receiving and being vertically vibrated by acoustic wave energy transmitted thereto via said elastic column from said wave generator, and said transducer including acoustic wave radiation means having an output impedance of the order of the impedance of said well fluids, whereby an effective and continuous acoustic coupling is made thereto, and said wave radiating means having greater output impedance in one direction of said vibration than in the other direction such as to generate a continuous output wave form characterized by high positive pressure half cycles alternating with low negative pressure half cycles, said wave radiation means including a flexible cup adapted to alternately expand into contact with the well casing, and to contract, in response to vertical vibration of said transducer.

8. The subject matter of claim 7, wherein said flexible cup is downwardly oriented.

9. The method of unclogging oil flow passages in a production well or in the productive formation therearound, which well contains open well fluid, that comprises: situating in said well, in the region of said passages or productive formation, in contact with said open well fluid, a reciprocating piston means adapted, upon reciprocation, to generate in the well fluid positive pressure half cycles alternating with negative pressure half cycles, moving the piston means on the negative pressure half cycle stroke sufficiently powerfully to effect separation of the piston means from the liquid and consequent creation of low pressure voids, and moving the piston means on the positive pressure half cycle stroke so as to collapse said voids, all in such manner as to generate a continuous repeating asymmetric acoustic wave characterized by positive pressure half cycles of high amplitude alternating with negative pressure half cycles of lower amplitude.

10. The method of unclogging oil flow passages in a production well or in the productive formation therearound, which well contains open well fluid, that comprises: situating in said well, in the region of said passages or productive formation, in contact with said open well fluid, a vibratory sound wave radiating surface which is adapted to radiate alternating positive and negative pressure half cycles into the well fluid, coupling to said radiating surface a sound wave generator, coupling said surface to said well fluid to a greater degree during generation of said positive pressure half cycles than during said negative pressure half cycles, whereby to produce in the well fluid a continuous repeating asymmetric acoustic wave characterized by positive pressure half cycles of high amplitude alternating with negative pressure half cycles of lower amplitude.

11. An apparatus of the character described, comprising: means affording a vibratory sound wave radiator surface situated in contact with well fluid inside a casing in a well, an acoustic wave generator acoustically coupled to said means so as to vibrate said sound wave radiator surface and thereby radiate alternating positive and negative pressure wave half cycles into the well fluid, and means effecting a greater degree of acoustic coupling between said surface during the positive pressure half cycle than during the negative pressure half cycle, so as to produce a continuous repeating asymmetric acoustic wave characterized by positive pressure half cycles of high amplitude alternating with negative pressure half cycles of lower amplitude.

References Cited in the file of this patent

UNITED STATES PATENTS

| | | |
|---|---|---|
| 2,150,406 | Taylor | Mar. 14, 1939 |
| 2,670,801 | Sherborne | Mar. 2, 1954 |
| 2,806,533 | Fleck | Sept. 7, 1957 |
| 2,816,612 | Hutchison et al. | Dec. 17, 1957 |

OTHER REFERENCES

"Sonics" (Hueter and Bolt), published by John Wiley and Sons, New York, 1955 (pages 227 to 232 and 288 to 295 relied on).